Dec. 19, 1961         D. A. BECKS         3,013,814
SIDE-CART ATTACHMENT FOR BICYCLES
Filed June 16, 1958
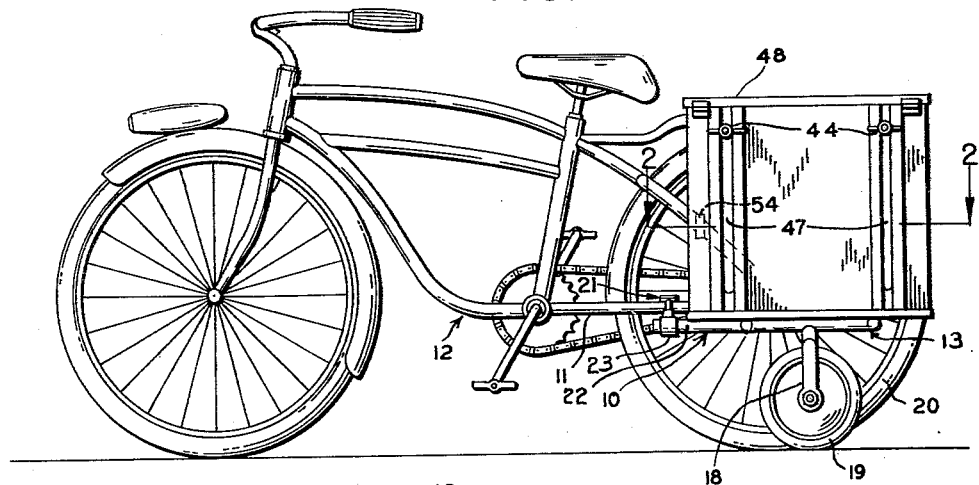
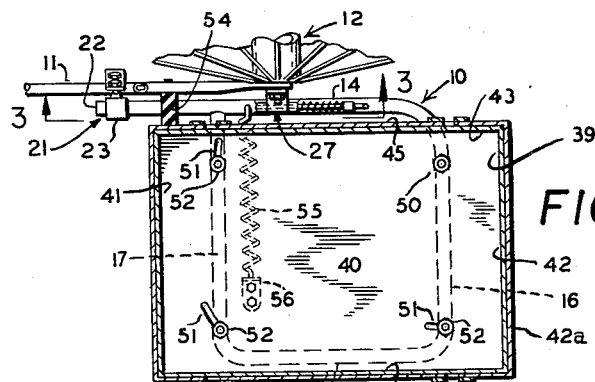
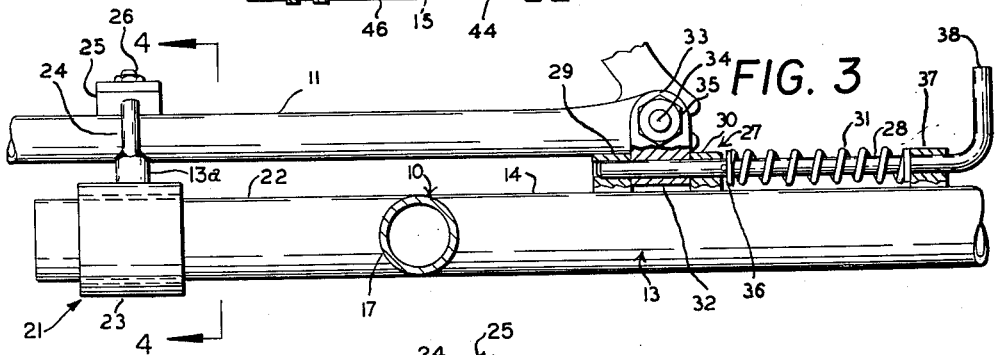
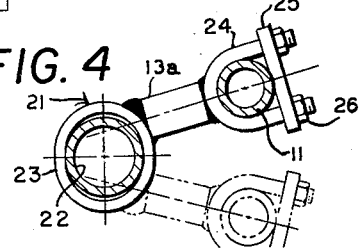
INVENTOR.
DONALD A. BECKS
BY
William Cleland
ATTORNEY

United States Patent Office 3,013,814
Patented Dec. 19, 1961

3,013,814
SIDE-CART ATTACHMENT FOR BICYCLES
Donald A. Becks, 1716 16th St., Cuyahoga Falls, Ohio
Filed June 16, 1958, Ser. No. 742,244
7 Claims. (Cl. 280—203)

This invention relates to a side-cart attachment for bicycles.

One object of the present invention is to provide a side-cart for a bicycle, including an improved device for quickly releasably attaching the same to the rear horizontal frame fork, and also including means by which the attaching device is adjustable to suit rear horizontal frame forks which are of varying heights from the ground, and thereby to maintain the cart in desired level condition.

Another object of the invention is to provide a side-cart of the character described having an article receiving receptacle which is telescopically adjustable to retain articles of different sizes, such as bundles of newspapers for newsboys.

Another object of the invention is to provide a cart of the character described wherein the receptacle is laterally adjustable with respect to the bicycle to permit normal tilting movement of the bicycle, as when maneuvering the same around a corner.

These and other objects of the invention will be manifest from the following brief description and the accompanying drawings.

Of the accompanying drawings:

FIGURE 1 is a side elevation of a bicycle having one embodiment of the improved side-cart attached thereto.

FIGURE 2 is an enlarged fragmentary cross-section of the improved cart, taken substantially on the line 2—2 of FIGURE 1.

FIGURE 3 is a further enlarged fragmentary detailed view of a portion of the cart attaching device, as viewed substantially on the line 3—3 of FIGURE 2.

FIGURE 4 is a vertical cross-section taken substantially on the line 4—4 of FIGURE 3.

Referring to the drawings generally, the numeral 10 designates a side-cart adapted to be releasably attached to one side bar 11 of a rear horizontal frame fork of a bicycle 12, of known type.

The cart 10 may include a rigid, horizontal, load-supporting member 13, formed loop-shaped from tubular stock to have laterally spaced straight inner and outer sides 14 and 15, respectively, and longitudinally spaced front and rear sides 16 and 17, respectively. Affixed on the outer side 15 of the member may be a yoke 18, in which is journalled a load-supporting wheel 19, adapted to be laterally spaced from a rear wheel 20 of the bicycle, and to follow in parallelism thereto.

For quickly releasably attaching, and pivotally supporting the member 13 to swing vertically on the bicycle frame, the side 14 of said member 13 may have a cylindrical forward extension 22, longitudinally slidably and pivotally received in a bearing sleeve 23 of a bracket 21 non-rotatably clamped to the side bar 11 of the bicycle frame, in forwardly spaced relationship with respect to the hub of the rear wheel 20. The means for clamping the bracket may include a U-bolt 24 connected to sleeve 23 by an arm 13a, and an apertured clamping plate 25 clamped against the bar 11 by means of nuts 26 threaded on the U-bolt. The quickly releasable attaching means may also include a locking device 27, comprising an elongated locking pin 28 pivotally and longitudinally slidably received through aligned apertures in longitudinally spaced lugs 29 and 30, affixed on the upper portion of the inner side 14 of member 13, and also through an apertured bearing element 32 snugly engaged between said spaced lugs 29 and 30, said bearing element being affixed on the bicycle frame as by having a flange extension 33, retained on a threaded extension 34 of the rear axle spindle of the bicycle by a clamping nut 35. Locking pin 28 may be held in the locking position best shown in FIGURE 3, as by means of a spring 31 engaged between a stop collar 36 thereon and a lug 37 affixed on the rear side 14 of the member, in longitudinally spaced relation to the lug 30. An angular extension 38 of the locking pin serves as a handle for manually releasing the forward end of the pin from the aligned apertures of the lug 29 and bearing element 32, thereby to permit disengagement of the bearing element with respect to the locking pin 28 and rearward removal of the member extension 22 from the sleeve 23.

The extension 22 may have a loose fit within the sleeve 23, as best shown in FIGURE 4, sufficient to permit slight downward tilting of the member 14 with respect to the bearing element 32, to permit said rearward removal of the extension 22 from the sleeve and, conversely, to permit reinsertion of the extension 22 in the sleeve.

The rear frame bar 11 varies in height from the ground on different bicycles. This variation, however, in general, resolves itself into two heights, namely, eleven and twelve inches from the ground. To allow for this, the U-bolt 24 may be rotatably adjusted, through adjustment of nuts 26, to position the sleeve 23 at desired height with respect to the ground.

It has been found desirable to maintain the cart frame member 13 at a given level, generally in a horizontal plane eleven and one-half inches above the ground. Accordingly, the center of sleeve 23 may be downwardly offset with respect to a point of intersection of the centerline of arm 13a with a vertical centerline of the sleeve 23, for the given higher position of fork bar 11 from the ground (12 inches). When, however, the bracket 21 is used on a bicycle having the rear fork bar 11 eleven inches above the ground the bracket 21 is selectively vertically reversed, so that it appears generally as shown in chain-dotted lines in FIGURE 4, wherein the center of sleeve 23 is upwardly offset with respect to said point of intersection of arm 13a and the vertical centerline of the sleeve.

For carrying bundles, such as newspapers, mounted on the cart may be a receptacle or container 39 having a bottom wall 40, front and rear walls 41 and 42, and inner and outer walls 43 and 44. Telescopically receiving the receptacle 39 may be a complemental extension 42a, which may be affixed in selected positions of vertical adjustment for different sized loads, of newspapers for example, as by means of thumb screws 44, 44 extended through holes in the spaced inner and outer walls 45 and 46 of extension 42a and through longitudinally spaced slots 47 in the inner and outer walls 43 and 44 of the receptacle 39. A hinged lid or cover 48 is shown provided on the container extension 42a.

To prevent interference of the container 39 with portions of the bicycle frame during the normal lateral tilting movement of the bicycle, upon maneuvering the same around corners, the container may be pivotably mounted on the member 13, by means of a pivot pin 50 having a vertical axis through the bottom wall 40 of the container and the inner portion of rear side 16 of the member. Arcuate slots 51, 51 are provided in the receptacle bottom 40 to be at a radius from the pivot 50, as shown in FIGURE 2, slidably to receive fastening bolts 52, 52 extended through the rear and front sides 16 and 17 of the member 13. These arcuate slots hold the receptacle 39 on the frame, but permit limited pivotal movement about the pivot 50 outwardly of the bicycle from a position in which a suitable rubber bumper on the bicycle frame engages the inner wall 43 of the receptacle, or the inner wall of telescopic extension 42a, said outward pivotal movement of the receptacle being against the yielding action of a tension spring 55 extended between inner frame member side 14 and a clip 56 attached to the underside of bottom wall 40. Said outward pivotal movement of the receptacle 39 is limited by engagement of the bolts 52 with the inner ends of the slots 51.

In operation of the bicycle 12 with the cart 10 attached thereto, the latter is adapted to pivot on the sleeve 23 and bearing element 32 with variations in the ground surface on which the bicycle is operated. When it is desired to operate the bicycle without the side-cart it may be detached in several seconds by yieldingly urging the handle 38 rearwardly of the bicycle to release the pin 28 from the bearing element 32, and thereby to permit slight downward tilting of member 13 to release the lugs 29 and 30 from the clip and to permit rearward removal of extension 22 from the sleeve 23. Conversely, the cart may be quickly attached to the bicycle in a few seconds by insertion of the extension 22 in the sleeve 23 while the locking pin is yieldingly held in rearwardly retracted position to permit insertion of the bearing element 32 between the lugs 29 and 30, after which the pin 28 may be released to permit the spring 31 to urge the pin through the aligned openings of the bearing element 32 and the lug 29.

Modifications of the invention may be resorted to without departing from the spirit thereof or the scope of the appended claims.

What is claimed is:

1. A cart for a bicycle having a frame portion, comprising a horizontal load-supporting member, means for pivotally attaching the inner portion of said member to said frame portion, ground-engaging wheel means mounted on the outer portion of said member, a receptacle mounted on said member, said receptacle having a connecting bottom and vertical walls, an extension for said receptacle including complemental walls in vertical telescopic connection with said vertical walls of the receptacle, and means for releasably securing said receptacle extension on said vertical receptacle walls in different positions of telescopic adjustment, said receptacle being pivotally connected to said member to be swingable laterally outwardly of the bicycle by engagement with a portion thereof upon lateral tilting of the bicycle, resilient means being provided for normally yieldingly urging said receptacle inwardly of the bicycle, and stop means being provided to limit the swinging movement of said receptacle in either direction.

2. A cart for a bicycle having a frame portion, comprising a horizontal load-supporting member, means for pivotally attaching the inner portion of said member to said frame portion, ground-engaging wheel means mounted on the outer portion of said member, a receptacle mounted on said member, said receptacle being pivotally connected to said member to be swingable laterally outwardly of the bicycle by engagement with a portion thereof upon lateral tilting of the bicycle, resilient means being provided for normally yieldingly urging said receptacle inwardly of the bicycle, and stop means being provided to limit the swinging movement of said receptacle in either direction.

3. A cart for a bicycle having a rear frame portion on which a rear ground-engaging wheel is mounted to rotate about a horizontal axis thereof, comprising bearing elements, means for mounting said bearing elements on said rear frame portion in spaced relation longitudinally of the bicycle, a load-supporting member having on an inner portion thereof spaced means for releasably pivotally connecting said bearing elements, thereby to permit said member to swing vertically on said bearing elements, and a ground-engaging wheel mounted on said member laterally outwardly of said inner portion, said receptacle being pivotally connected to said member to be swingable laterally outwardly of the bicycle by engagement with a portion thereof upon lateral tilting of the bicycle, resilient means being provided for normally yieldingly urging said receptacle inwardly of the bicycle, and stop means being provided to limit the swinging movement of said receptacle in either direction.

4. A cart for a bicycle having a rear frame portion on which a rear ground-engaging wheel is mounted to rotate about a horizontal axis thereof, comprising front and rear bearing elements having axes extending horizontally and below said axis of the rear wheel substantially in a vertical plane, the axis of said rear bearing element being upwardly offset with respect to the axis of said front bearing element and parallel thereto, independent means for adjustably mounting the respective said bearing elements on said rear frame portion in spaced relation longitudinally of the bicycle and to be selectively vertically adjustable to given positions relatively of each other and the frame portion, a load-supporting member having on an inner portion thereof spaced journal means for removable reception in said bearing elements to permit said member to swing vertically on said bearing elements, manually operable means including a quickly-operable locking device for releasably retaining said journal means in said bearing elements and a ground-engaging wheel mounted on said member laterally outwardly of said inner portion, whereby said load-supporting member is removable from said frame portion by releasing said journal means.

5. A cart for a bicycle having a rear frame portion on which a rear ground-engaging wheel is mounted to rotate about a horizontal axis thereof, comprising bearing elements, means for adjustably mounting said bearing elements on said rear frame portion in spaced relation longitudinally of the bicycle to be selectively adjustable to given positions relatively of each other, a load-supporting member having on an inner portion thereof spaced journal means for removable reception in said bearing elements to permit said member to swing vertically on said bearing elements, and a ground-engaging wheel mounted on said member laterally outwardly of said inner portion, one said spaced journal means having a freely extending end for slidable pivotal reception in one said bearing element, the other said journal means including spring-pressed rod for yieldingly releasable pivotal reception in the other said bearing element, whereby upon yielding withdrawal of said rod from the other said journal means said freely extending end is slidably removable from said one bearing element to remove said load-supporting member from the bicycle.

6. A cart for a bicycle having a rear frame portion on which a rear ground-engaging wheel is mounted to rotate about a horizontal axis thereof, comprising bearing elements, means adjustably mounting said bearing elements on said rear frame portion in spaced relation longitudinally of the bicycle and to be selectively adjustable to given positions relatively of each other, a load-supporting member having on an inner portion thereof spaced journal means for removable reception in said bearing elements to permit said member to swing vertically on said bearing elements, manually operable means for releasably retaining said journal means in said bearings, and a ground-engaging wheel mounted on said member laterally outwardly of said inner portion, one said spaced journal means having a freely extending end for slidable pivotal reception in one said bearing element, the other said journal means including a spring-pressed rod for yieldingly releasable pivotal reception in the other said bearing element, whereby upon yielding withdrawal of said rod said freely extending end and the rod are removable from the respective said bearing elements therefor, means being provided to prevent longitudinal movement of said load-supporting member with respect to said bearing elements.

7. A cart for a bicycle having a rear frame portion on which a rear ground-engaging wheel is mounted to rotate about a horizontal axis thereof, comprising front and rear bearing elements, means for mounting said bearing elements on said rear frame portion in spaced relation longitudinally of the bicycle, a load-supporting member having on an inner portion thereof spaced front and rear journal means for removable reception in said bearing elements to permit said member to swing vertically on said bearing elements, manually operable means for releasably retaining said journal means in said bearing elements, and a ground-engaging wheel mounted on said member laterally outwardly of said inner portion, said bearing elements including normally relatively fixed front and rear bearing sleeves, said front journal means being a generally cylindrical forward protrusion for pivotal reception in said front bearing sleeve, said rear journal means including longitudinally spaced lugs affixed on said inner portion of said member for reception therebetween of said rear bearing sleeve, and a spring-pressed rod mounted on said load-supporting member for yieldingly releasable and pivotal reception through said spaced lugs and said rear sleeve, whereby upon yielding withdrawal of said rod to release said rear sleeve from between said spaced lugs said forward protrusion is rearwardly removable from said front sleeve.

References Cited in the file of this patent

UNITED STATES PATENTS

| | | |
|---|---|---|
| 1,120,955 | Martin | Dec. 15, 1914 |
| 1,570,135 | Emmert | Jan. 19, 1926 |
| 1,594,615 | Harley et al. | Aug. 3, 1926 |
| 1,829,729 | Blanton | Nov. 3, 1931 |
| 2,544,099 | Malin | Mar. 6, 1951 |

FOREIGN PATENTS

| | | |
|---|---|---|
| 870,608 | France | Dec. 22, 1941 |
| 885,239 | France | May 24, 1943 |
| 903,409 | France | Jan. 15, 1945 |
| 449,616 | Italy | Sept. 25, 1949 |